United States Patent [19]

Aoki et al.

[11] Patent Number: 5,762,576
[45] Date of Patent: Jun. 9, 1998

[54] HYDRAULIC CONTROL APPARATUS FOR CONTINUOUSLY VARIABLE TRANSMISSION OF VEHICLE

[75] Inventors: Takashi Aoki; Kaoru Kajikawa, both of Saitama-ken, Japan

[73] Assignee: Honda Giken Kogyo Kabushiki Kaisha, Tokyo, Japan

[21] Appl. No.: 699,702

[22] Filed: Aug. 15, 1996

[30] Foreign Application Priority Data

Sep. 1, 1995 [JP] Japan ................. 7-248730

[51] Int. Cl.[6] .................................. F16H 9/00
[52] U.S. Cl. .................. 475/45; 475/44; 475/48; 474/28
[58] Field of Search .................. 477/45, 44, 48; 474/18, 28

[56] References Cited

U.S. PATENT DOCUMENTS

| 4,699,604 | 10/1987 | Yokoyama | 474/18 |
|---|---|---|---|
| 4,718,308 | 1/1988 | Haley | 474/28 X |
| 4,962,678 | 10/1990 | Murano et al. | 477/45 |
| 4,967,621 | 11/1990 | Soga et al. | 477/49 |
| 5,012,696 | 5/1991 | Miyawaki | 477/45 |
| 5,052,980 | 10/1991 | Itoh et al. | 474/11 |
| 5,074,168 | 12/1991 | Ishikawa et al. | 477/126 |
| 5,086,672 | 2/1992 | Kato et al. | 477/45 X |
| 5,183,439 | 2/1993 | Yumoto et al. | 474/28 |
| 5,427,579 | 6/1995 | Kanehara et al. | 474/28 |
| 5,649,876 | 7/1997 | Morishita | 474/28 |

FOREIGN PATENT DOCUMENTS 62-196447  8/1987  Japan.
7-4485 A   1/1995  Japan.

*Primary Examiner*—Charles A. Marmor
*Assistant Examiner*—Peter T. Kwon
*Attorney, Agent, or Firm*—Nikaido, Marmelstein, Murray & Oram LLP

[57] ABSTRACT

A hydraulic control apparatus for a continuously variable transmission includes an inhibit valve that blocks the supply of hydraulic pressure to a reverse-drive brake during forward movement, and an inhibit solenoid valve that relieves the hydraulic pressure in a fluid passage acting on a spool of the inhibit valve so as to move the spool to the closed side and also relieves the hydraulic pressure in another fluid passage acting on a high-pressure regulator valve to urge the same to the low-pressure side, thereby increasing the high fluid pressure. This arrangement is able to improve the transient response of the control apparatus without providing additional pressure control valves as done in the conventional apparatus. The control apparatus can be manufactured with reduced number of components and at a relatively low cost.

1 Claim, 9 Drawing Sheets 5,762,576

HYDRAULIC CONTROL APPARATUS FOR CONTINUOUSLY VARIABLE TRANSMISSION OF VEHICLE

BACKGROUND OF THE INVENTION

1. Field of the Invention

The present invention relates to a hydraulic control apparatus for a continuously variable transmission mounted on a motor vehicle.

2. Description of the Related Art

Belt type continuously variable transmissions composed of a drive pulley and a driven pulley adapted to be varied in width by hydraulic actuators to continuously vary the speed ratio of the pulleys have been widely put to practical application.

The transmissions of the type concerned generally encounter a problem that when undertaking a sudden speed change or shift, the hydraulic pressure supplied to one pulley tends to drop excessively, allowing the belt to slip on the pulley.

To deal with this problem, Japanese Patent Laid-Open Publication No. SHO 62-196447 discloses a hydraulic control apparatus for a belt type continuously variable vehicle transmission, which comprises a first pressure control valve for controlling a high-pressure side hydraulic pressure and a second pressure control valve for controlling a low-pressure side hydraulic pressure arranged such that the pressure characteristics in accelerating/decelerating speed ranges are changed at option to obtain a sufficient transient response for the variable speed ratio control and to prevent slippage of the belt.

However, since the two pressure control valves require two signal lines, the conventional hydraulic control apparatus has an increased number of components and hence requires a greater space for installation and an increased cost for manufacture.

SUMMARY OF THE INVENTION

It is accordingly an object of the present invention to provide a hydraulic control apparatus for a continuously variable transmission of a vehicle, which is capable of preventing slippage of the belt while providing a sufficient transient response for the speed ratio control without increasing the number of components.

In brief, a hydraulic control apparatus for a continuously variable transmission mounted on a motor vehicle includes a shift control valve for selectively supplying a high hydraulic pressure and a low hydraulic pressure to a drive cylinder chamber in a drive pulley and a driven cylinder chamber in a driven pulley while regulating the hydraulic pressures, a high-pressure regulator valve and a low-pressure regulator valve for supplying a pressure-regulated high hydraulic pressure and a pressure-regulated low hydraulic pressure, respectively, to the shift control valve, a high-low pressure control valve for supplying a control pressure to the high-pressure regulator valve and the low-pressure regulator valve for controlling the regulator valves, an inhibit valve for stopping the supply of a hydraulic pressure to a reverse-drive brake of the transmission while the vehicle is being driven forward, and a solenoid valve for controlling a control hydraulic pressure used for controlling the operation of the inhibit valve, and for applying the control hydraulic pressure to the high-pressure regulator valve so as to further increase the high hydraulic pressure, wherein the solenoid valve relieves the hydraulic pressure in a fluid passage that urges the high-pressure regulator valve toward a low pressure side, thereby increasing the high hydraulic pressure alone.

While the vehicle is running forward, the shift to reverse is inhibited by the blocking or inhibiting action of the inhibit valve. Under the action of the inhibit solenoid valve that controls the inhibit valve to the blocking side, the high hydraulic pressure is increased to such an extent that owing to an enlarged pressure difference built up between the high hydraulic pressure and the low hydraulic pressure, a sufficient transient response for the speed ratio control can be obtained. In this instance, there is no need for lowering the low hydraulic pressure, and so the slippage of the belt does not occur at all.

The hydraulic control apparatus of the invention is able to increase the transient response by utilizing the existing valves, instead of adding separate valves as done in the conventional apparatus. Thus, the number of components of the apparatus is not increased at all. Furthermore, since the high hydraulic pressure is increased by relieving the hydraulic pressure, a desired pressure rise can be obtained spontaneously with a better transient response than as provided when a hydraulic pressure is applied to further increase the high hydraulic pressure.

It is preferable that the condition under which the solenoid valve is operated to apply the control hydraulic pressure to the high-pressure regulator valve for further increasing the high hydraulic pressure is when a sudden change in speed is desired according to the operating conditions.

Since the high hydraulic pressure is further increased only when a sudden speed change or shift is necessary, the desired shift can be achieved with improved transient response.

The above and other objects, features and advantages of the present invention will become manifest to those versed in the art upon making reference to the detailed description and accompanying sheets of drawings in which a preferred structural embodiment incorporating the principles of the present invention is shown by way of illustrative example.

DETAILED DESCRIPTION OF THE PREFERRED EMBODIMENT

One preferred embodiment of the present invention will be described below in greater detail with reference to the accompanying sheets of drawings.

Figure 1:
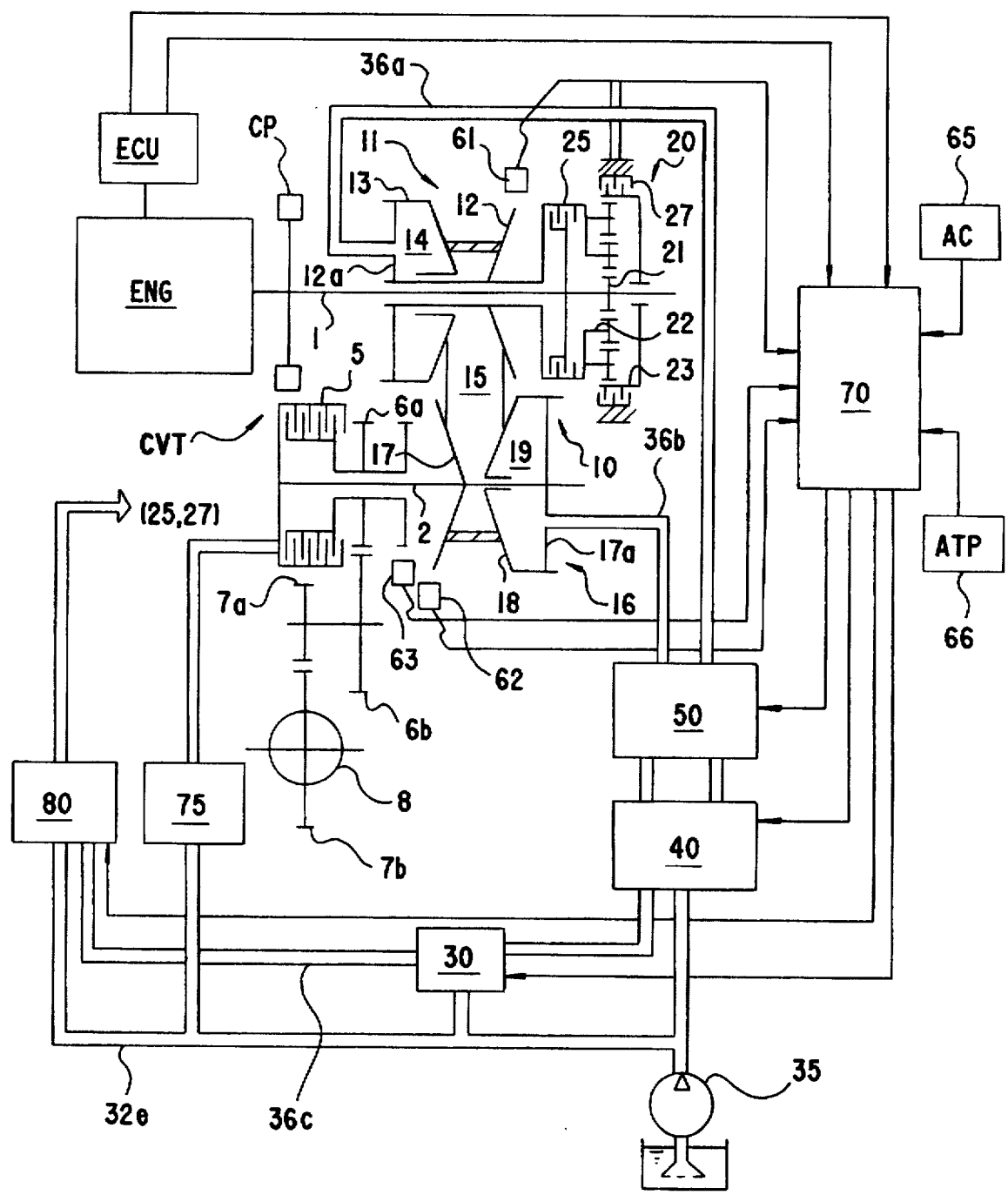
FIG. 1 is a schematic view showing the principle of a belt type continuously variable transmission including a hydraulic control apparatus according to the present invention.

FIG. 1 schematically shows the principle of a belt type continuously variable transmission equipped with a hydraulic control apparatus according to the present invention.

The belt type continuously variable transmission, hereinafter referred to as "CVT", is comprised of a metal V-belt mechanism 10 disposed between an input shaft 1. and a counter shaft 2, a planetary gear type forward-reverse shift mechanism 20 disposed between the input shaft 1 and a drive pulley 11, and a start-up clutch 5 disposed between the counter shaft 2 and an output side member (including a differential unit or mechanism 8).

The CVT is designed for use in a motor vehicle, and so the input shaft 1 is coupled with the output shaft of an engine ENG of the vehicle, and a driving power transmitted to the differential mechanism 8 is finally transmitted to left and right wheels (not shown) of the vehicle.

The metal V-belt mechanism 10 comprises the drive pulley 11 mounted on the input shaft 1, a driven pulley 16 mounted on the counter shaft 2, and a metal V-belt 15 extending between the pulleys 11, 16.

The drive pulley 11 is composed of a fixed pulley half or member 12 rotatably mounted on the input shaft 1, and a movable pulley half or member 13 axially displaceable on the input shaft 1 relative to the fixed pulley member 12.

The movable pulley member 13 has defined therein a lateral drive cylinder chamber 14 surrounded by a cylinder wall 12a connected to the fixed pulley member 12 so that a lateral or side pressure needed for axially displacing the movable pulley member 13 is generated by a hydraulic pressure supplied into the drive cylinder chamber 14 via a fluid passage 36a.

The driven pulley 16 is composed of a fixed pulley half or member 17 fixed to the counter shaft 2, and a movable pulley half or member 18 axially displaceable on the counter shaft 2 relative to the fixed pulley member 17.

The movable pulley member 18 has defined therein a lateral driven cylinder chamber 19 surrounded by a cylinder wall 17a connected to the fixed pulley member 17 so that a lateral or side pressure needed for axially displacing the movable pulley member 18 is generated by a hydraulic pressure supplied in the driven cylinder chamber 19 via a fluid passage 36b.

With this arrangement, by appropriately controlling a supply hydraulic pressure (pulley control hydraulic pressure) for each of the cylinder chambers 14, 18, it becomes possible to set proper pulley side pressures needed for preventing slippage of the belt 15 on the pulleys 11, 16 and to change the respective widths of the pulleys 11, 16 for varying the contact radius of the V-belt 15 (effective diameter of pulleys 11, 16) whereby the speed ratio of the pulleys 11, 16 (i.e., the velocity ratio of the shafts 1, 2) can be continuously varied.

The planetary gear type forward and reverse shift mechanism 20 is composed of a sun gear 21 connected to the input shaft 1, a carrier 22 connected to the fixed pulley member 12, a ring gear 23 that can be locked or held immovable by a reverse-drive brake 27, and a forward-drive clutch 25 that can interconnect the sun gear 21 and the carrier 22.

When the forward-drive clutch 25 is engaged, all the gears 21, 22, 23 rotate in unison with the input shaft 1, and so the drive pulley 11 is driven in the same direction (forward direction) as the input shaft 1.

When the reverse-drive brake 27 is engaged or otherwise activated, the ring gear 23 is locked or held immovable, and so the carrier 22 and the sun gear 21 are driven in opposite directions. Thus, the drive pulley 11 is driven in the opposite direction (reverse direction) from the input shaft 1.

The reverse-drive brake 27 is driven via a fluid passage 36c across which a reverse inhibit mechanism 30 is disposed. The reverse inhibit mechanism 30, as will be described below in further detail, is a mechanism that inhibits the reverse mode from becoming effective even when a manual shift lever (not shown) is unintentionally shifted to the reverse position while the vehicle is moving forward.

When the forward-drive clutch 25 and the reverse-drive brake 27 are both disengaged or released, transmission of the driving power through the forward-reverse shift mechanism 20 is interrupted whereby power transmission between the engine ENG and the driven pulley 11 is no longer taken place.

The start-up clutch 5 is a clutch that performs an on-off control of transmission of the driving power between the counter shaft 2 and the output side member. When the start-up clutch 5 is engaged ("on" state), transmission of the driving power between the counter shaft 2 and the output side member is enabled. To this end, when the start-up clutch 5 is on, the engine power having a speed ratio set by the metal V-belt mechanism 10 is transmitted via a gear train 6a, 6b, 7a, 7b to the differential mechanism 8 and then divided into separate powers transmitted to the left and right wheels (not shown), separately. With the start-up clutch 5 off, the aforesaid power transmission cannot take place, and so the CVT is in the neutral condition.

Then, a hydraulic control apparatus for the CVT of the foregoing construction will be described. The control apparatus comprises a regulator valves group 40 for creating pulley control hydraulic pressures to be supplied to the drive cylinder chamber 14 and the driven cylinder chamber 19, Et shift control valve unit 50 for controlling the supply of the pulley control hydraulic pressures to the respective cylinder chambers 14, 19, a clutch control valve 75 for controlling the operation of the start-up clutch 5, and a manual valve 80 adapted to be actuated according to the position of a manual shift lever (not shown).

Operation of the regulator valves group 40, the shift control valve unit 50, and the clutch control valve 75 is controlled in accordance with signals supplied from a controller 70. To this end, the controller 70 receives from an engine control unit ECU, signals indicative of an engine speed or rpm and an intake manifold vacuum PB. The controller 70 is also supplied with a signal representing the rotating speed (rpm) of the drive pulley 11, a signal representing the rotating speed (rpm) of the driven pulley 16, and a signal representing the rotating speed (rpm) of the gear 6a, respectively, from a first sensor 60, a second sensor 62, and a third sensor 63. The controller 70 further receives a detection signal. From an air-conditioner operation detecting device 65 that detects the operation of an air-conditioner AC, and a detection signal from a shift range detecting device 66 that detects the shift range position according to a manual shift lever position ATP (or a spool position of the manual valve 80).

Figure 2:
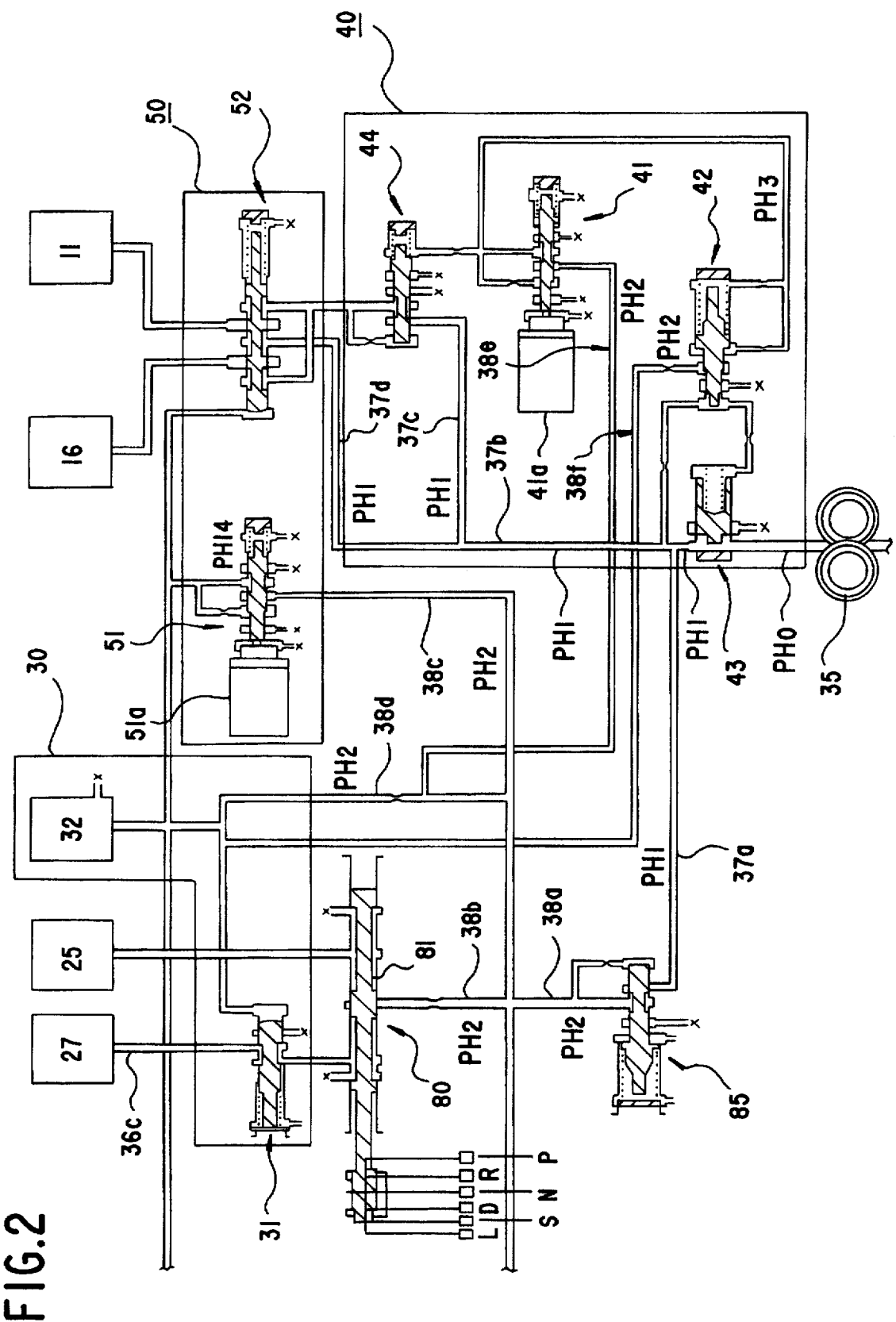
FIG. 2 is a circuit diagram of the hydraulic control apparatus incorporated in the continuously variable transmission.

FIG. 2 illustrates a circuit diagram of the hydraulic control apparatus of the invention embodied in the vehicle CVT mechanism.

The regulator valves group 40 is comprised of a high-low pressure control valve 41, a high-pressure control valve 42, a high-pressure regulator valve 43, and a low-pressure regulator valve 44. The high-low pressure control valve 41 is composed of a solenoid valve provided with a solenoid actuator 41a.

The shift control valve unit 50 is comprised of an shift control valve 51 and a shift valve 52. The shift control valve 51 is composed of a solenoid valve provided with a solenoid actuator 51a.

The manual valve 80, left center on the sheet of FIG. 2, is a valve of the type including a spool 81 movable selectively between "low" (L,), "sport" (S), "drive" (D), "neutral" (N), "reverse" (R), and "parking" (P) positions by the non-illustrated manual shift lever. Designated by 85 is a constant pressure valve for supplying a hydraulic operating fluid at a constant pressure to the manual valve 80.

The reverse inhibit mechanism 30 comprises an inhibit valve 31 disposed in the fluid passage 36c connected with the reverse-drive brake 27, and an inhibit solenoid valve 32 for relieving an appropriate hydraulic pressure from the hydraulic system.

In FIG. 2, the mark "x" represents a drain.

Operation of the hydraulic control apparatus of the foregoing construction will be described below with reference to FIG. 2 and FIGS. 3–7 each showing a part of FIG. 2 on enlarged scale.

In FIG. 2, the hydraulic operating fluid pressurized by a pump 35 at a pressure PH0 is regulated by the high-pressure regulator valve 43 so that a pressure PHi is obtained. With this pressure regulation, the hydraulic pressure in fluid passages 37a, 37b and 37c is PH1. The hydraulic pressure at the secondary side of the constant pressure valve 85 is PH2, and so the hydraulic pressure in fluid passages 38a, 38b, 38c, 38d, 38e and 38f is PH2.

Figure 3:
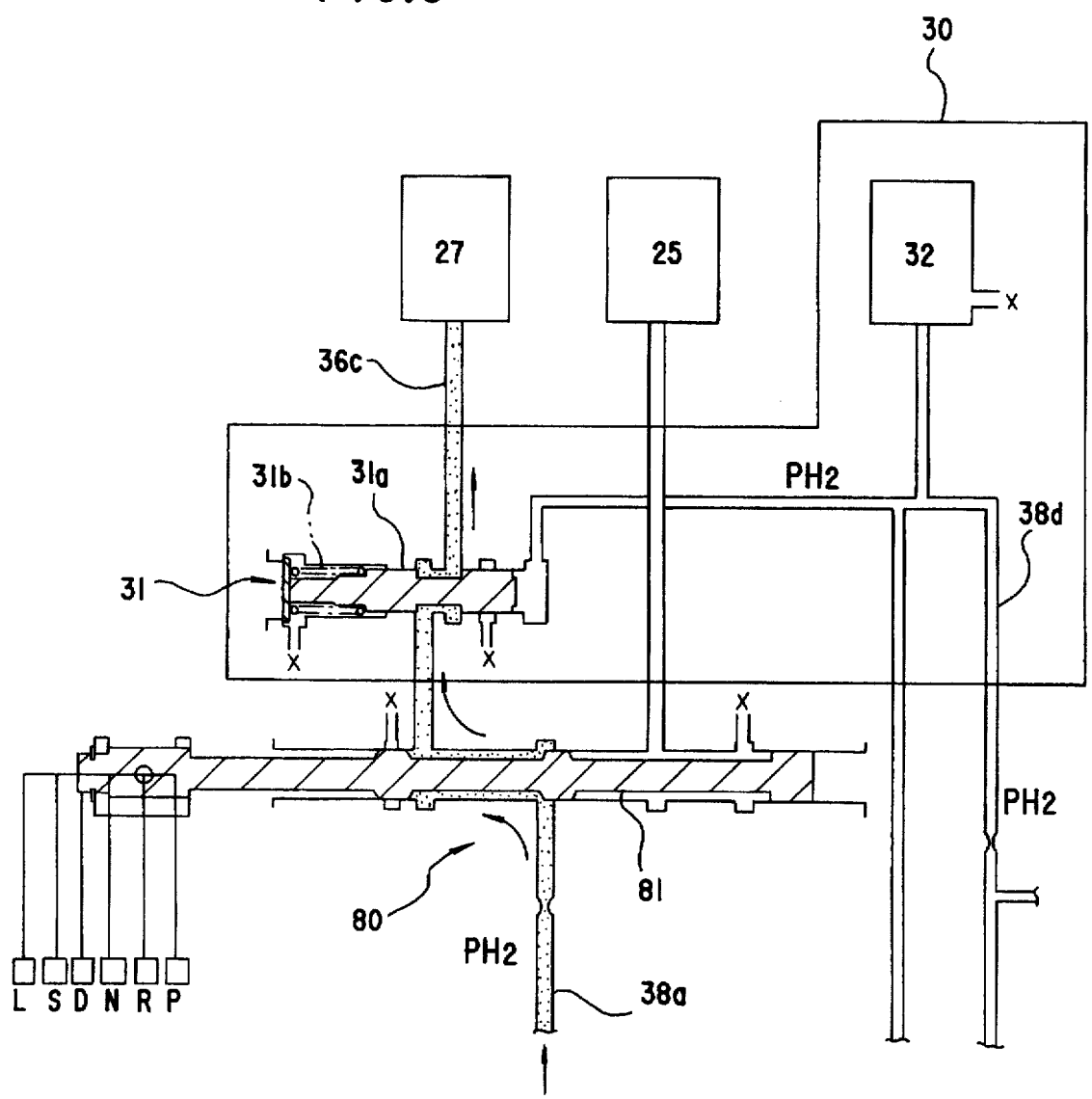
FIG. 3 is a view illustrative of the operation of a reverse inhibit mechanism while in the reverse mode.

FIG. 3 is a view explanatory of the operation of the reverse inhibit mechanism 30 while in the reverse mode. In the reverse mode, the inhibit solenoid valve 32 is closed. The inhibit valve 31 has a spool 31a held immovable at the illustrated balanced position under the force of a spring 31b acting on one end 31a and the hydraulic pressure PH2 acting on the other end.

As the manual valve 80 is shifted to reverse, the hydraulic operating fluid is allowed to flow in a manner as indicated by great many small dots for clarity, and eventually activates the reverse-drive brake 27.

Figure 4:
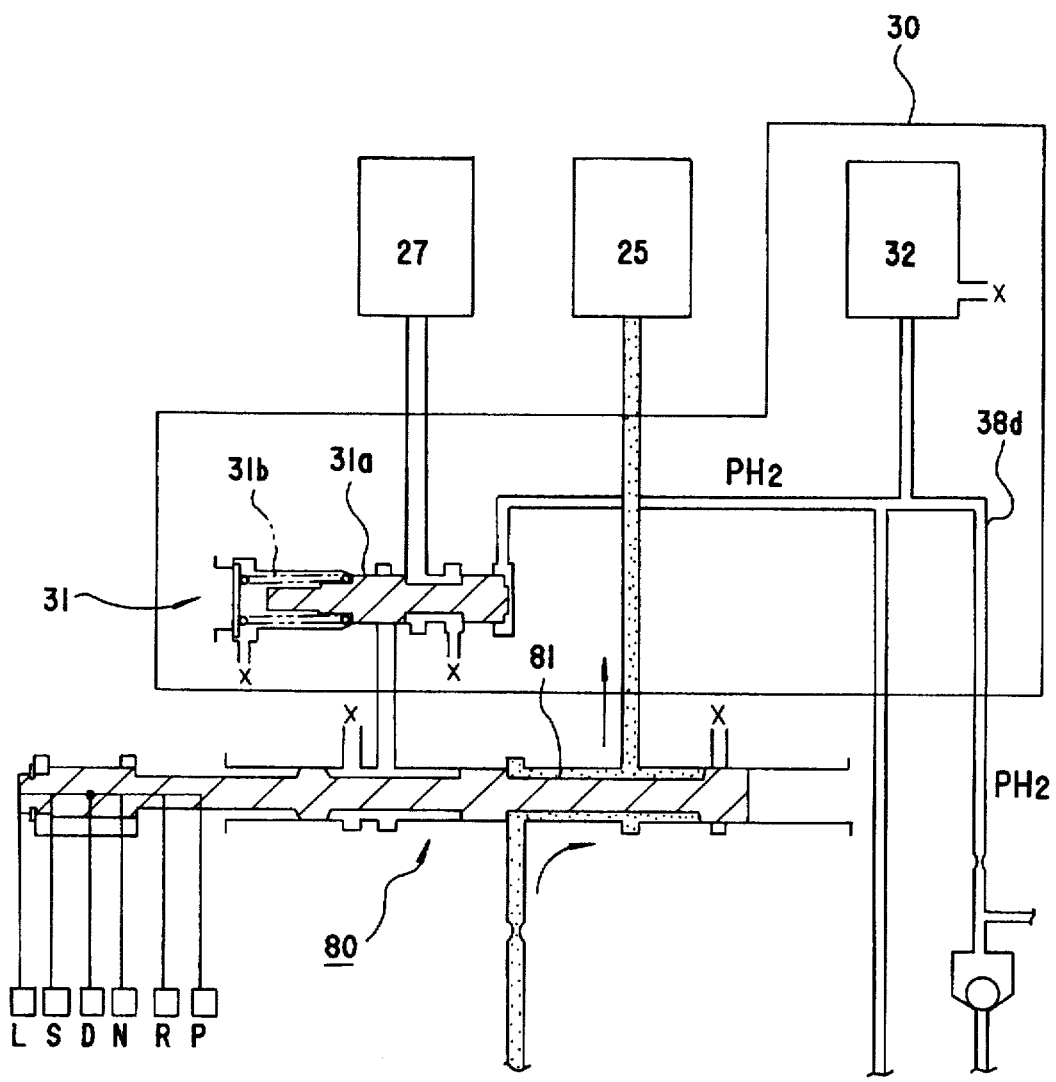
FIG. 4 is a view illustrative of the operation of the reverse inhibit mechanism while in the forward mode.

FIG. 4 is a view illustrative of the operation of the reverse inhibit mechanism 30 in the forward mode. When the manual valve 80 is shifted, the hydraulic operating fluid is allowed to flow in a manner as indicated by great many small dots for clarity, and eventually activates or engages the forward-drive clutch 25.

Now, description will be given of two conditions (1) and (2) necessary for opening the inhibit solenoid valve 32.
Condition (1):

In the forward mode, the manual shift lever is shifted to the reverse range whereupon the inhibit solenoid valve 32 is opened. This condition is determined by a judgment based on information about a vehicle speed and a range switch. With the inhibit solenoid valve 32 open, the hydraulic pressure in the fluid passage 38d drops to zero whereupon the inhibit valve 31 is closed by the force of the spring 31b.

Thus, while in the forward mode, even when the manual valve 80 is shifted to reverse side, no hydraulic operating fluid is supplied to the reverse-drive brake 27. As a consequence, the reverse mode is not enabled. This is very purpose for which the reverse inhibit is achieved.
Condition (2):

The inhibit solenoid valve 32 is opened when a sudden speed change or shift is judged as being needed according to operating conditions, such, for example, as when the gas pedal or accelerator is pressed excessively for rapid acceleration, or when the speed ratio is to be immediately shifted to the low position during rapid acceleration. Even if the shift range is set to reverse when the solenoid is opened during rapid acceleration, no problem will arise because the inhibit valve is operating to inhibit the hydraulic fluid to establish the reverse mode. The operation to open the inhibit solenoid valve under the condition (2) is performed so as to change the high hydraulic pressure PH to a higher hydraulic pressure PHH, as will be described later.

Figure 5:
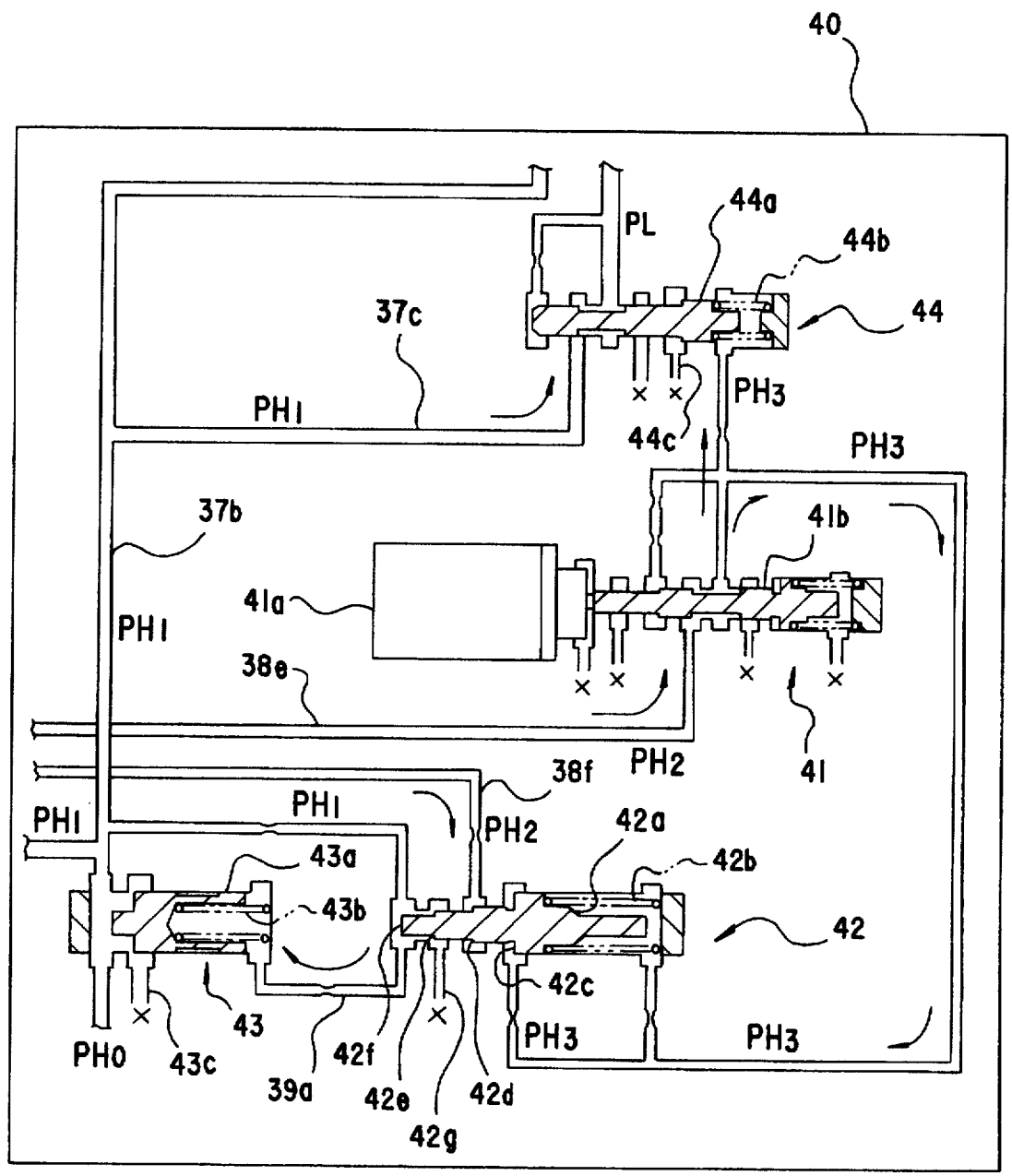
FIG. 5 is a view illustrative of the operation of a high-low pressure control valve.

FIG. 5 is a view illustrative of the operation mainly of the high-low pressure control valve 41. The high-low pressure control valve 41 builds up or creates a control pressure PH3 from the primary pressure PH2 bymoving a spool 41b by the action of the solenoid actuator 41a. The control pressure PH3 commonly acts on the low-pressure regulator valve 44 and the high-pressure control valve 42.

In the low-pressure regulator valve 44, a spool 44a has one end (right end in FIG. 5) on which the force of a spring 44b and the control pressure PH3 act. When the control pressure PH3 is large, the spool 44a is displaced leftwards in FIG. 5, thus reducing the amount of drain from a drain port 44c. Given that the secondary pressure of the low-pressure regulator valve 44 is PL, the PL increases with a reduction in amount of drain. Conversely, when the control pressure PH3 is small, the secondary pressure PL decreases.

In the high-pressure control valve 42, a spool 42a has one side surface (right side surface in FIG. 5) subjected to the force of a spring 42b and the control pressure PH3, and a left side portion (left side portion in FIG. 5) shaped into a multi-step shaft including a large-diameter step 42c, an intermediate step 42d, and a small-diameter step 42e that are respectively subjected to the pressures PH3, PH2, and PH1. The pressure PH1 is applied also to an end face 42f of the multi-step shaft of the spool 42a.

From the balanced condition, if the control pressure PH3 is increased alone, the spool 42a is displaced leftwards in FIG. 5 owing to the relation in pressure-receiving area between the right side and the left side of the spool 42a. With this leftward movement of the spool 42a, the amount of drain from a drain port 42g decreases, thereby increasing the pressure in a fluid passage 39a. By virtue of this pressure rise (which is added up with the bias of a spring 43b), a spool 43a of the high-pressure regulator valve 43 is displaced leftwards in FIG. 5, whereby the amount of drain from a drain port 43c is reduced and the secondary pressure PH1 of the high-pressure regulator valve 43 is increased. Conversely, the secondary pressure PH21 of the high-pressure regulator valve 43 decreases when the control pressure PH3 is decreased.

Figure 6:
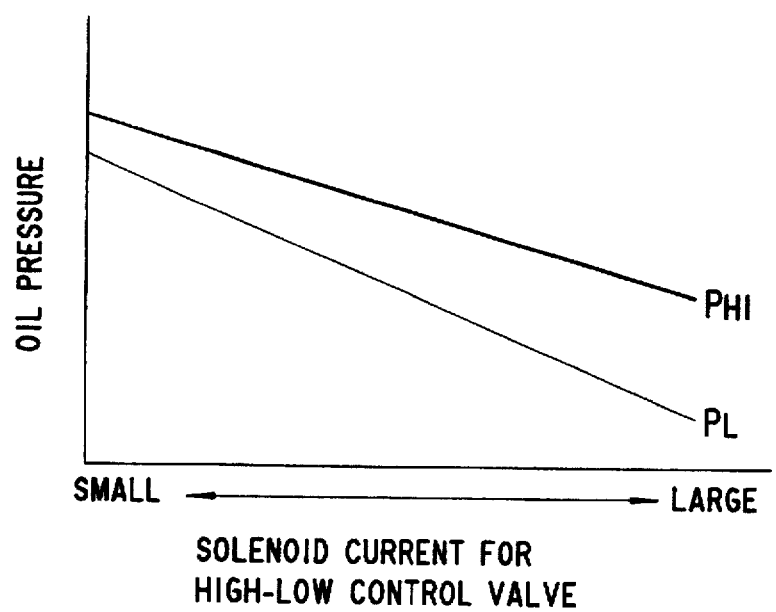
FIG. 6 is a graph showing the operation of the high-low pressure control valve.

FIG. 6 is a graph showing the operation of the high-low pressure control valve 41 (labeled as "HIGH-LOW CONTROL VALVE" in the same figure). The x axis of the graph is the solenoid current of the high-low pressure control valve 41, and the y axis is the hydraulic pressure (labeled as "OIL PRESSURE" in the same figure).

It will be understood from the graph that the high hydraulic pressure PH1 and the low hydraulic pressure PL vary while keeping a certain correlation under the action of the high-low pressure control valve 41.

Figure 7:
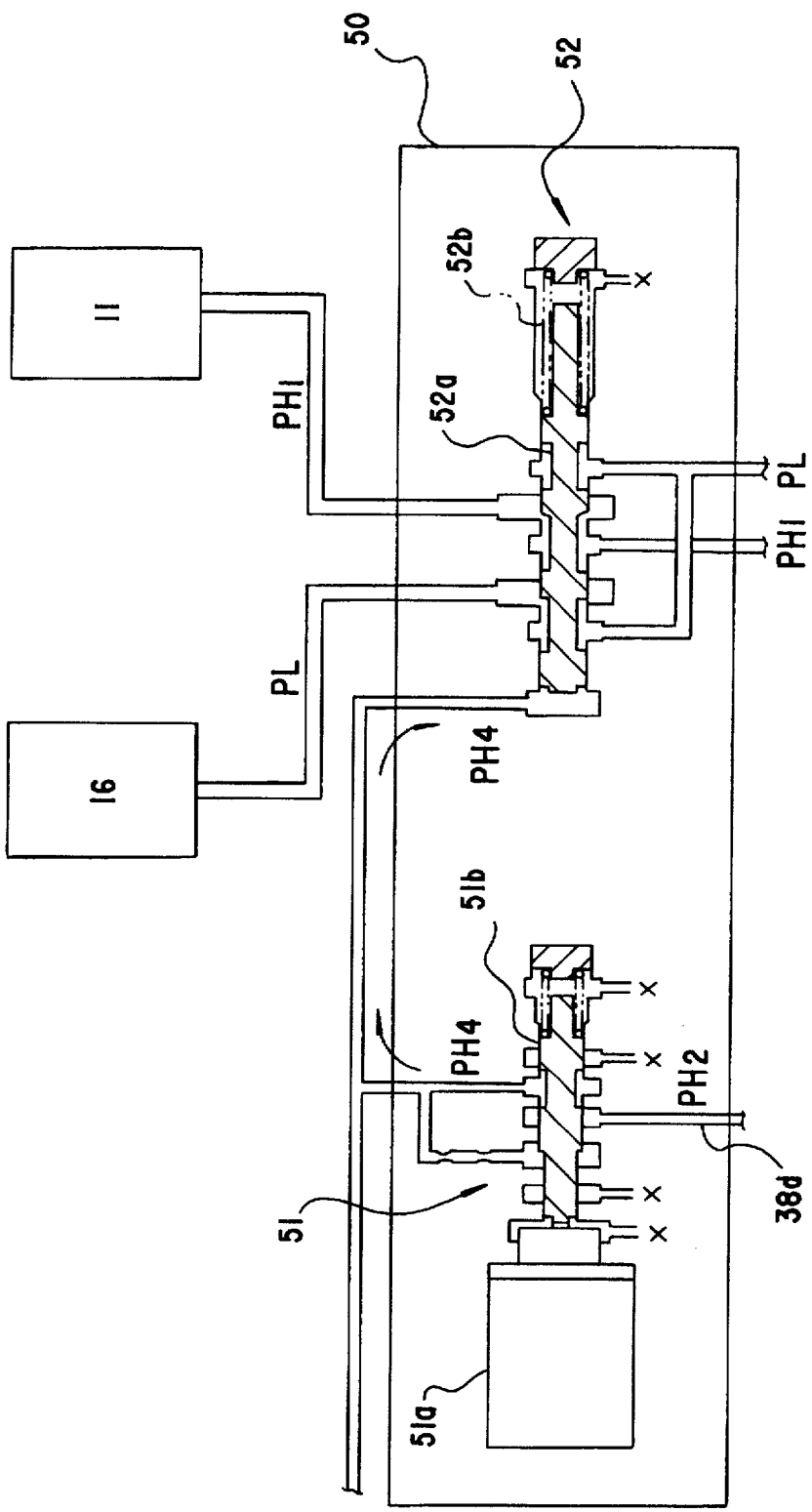
FIG. 7 is a view showing the operation of a shift control valve and a shift valve.

FIG. 7 is a view illustrative of the operation of the shift control valve 51 and the shift valve 52. The shift control valve 51 moves its spool 51b to change the pressure of the hydraulic operating fluid from the primary pressure PH2 to the secondary pressure PH4 when the solenoid actuator 51a is activated upon receipt of a command from the controller 70 (FIG. 1).

The secondary pressure PH4 acts on one end of a spool 52a of the shift valve 52 against the force of the spring 52b acting on the opposite end of the spool 52a.

In FIG. 7, the high hydraulic pressure PH1 acts on the drive pulley 11, and the low hydraulic pressure PL acts on the driven pulley 16. In this condition, if the pressure PH4 is increased, the spool 52a can be displaced to such a great extent that the direction of action of the high or low pressure hydraulic pressure is switched over, or the neutral condition is established.

Figure 8:
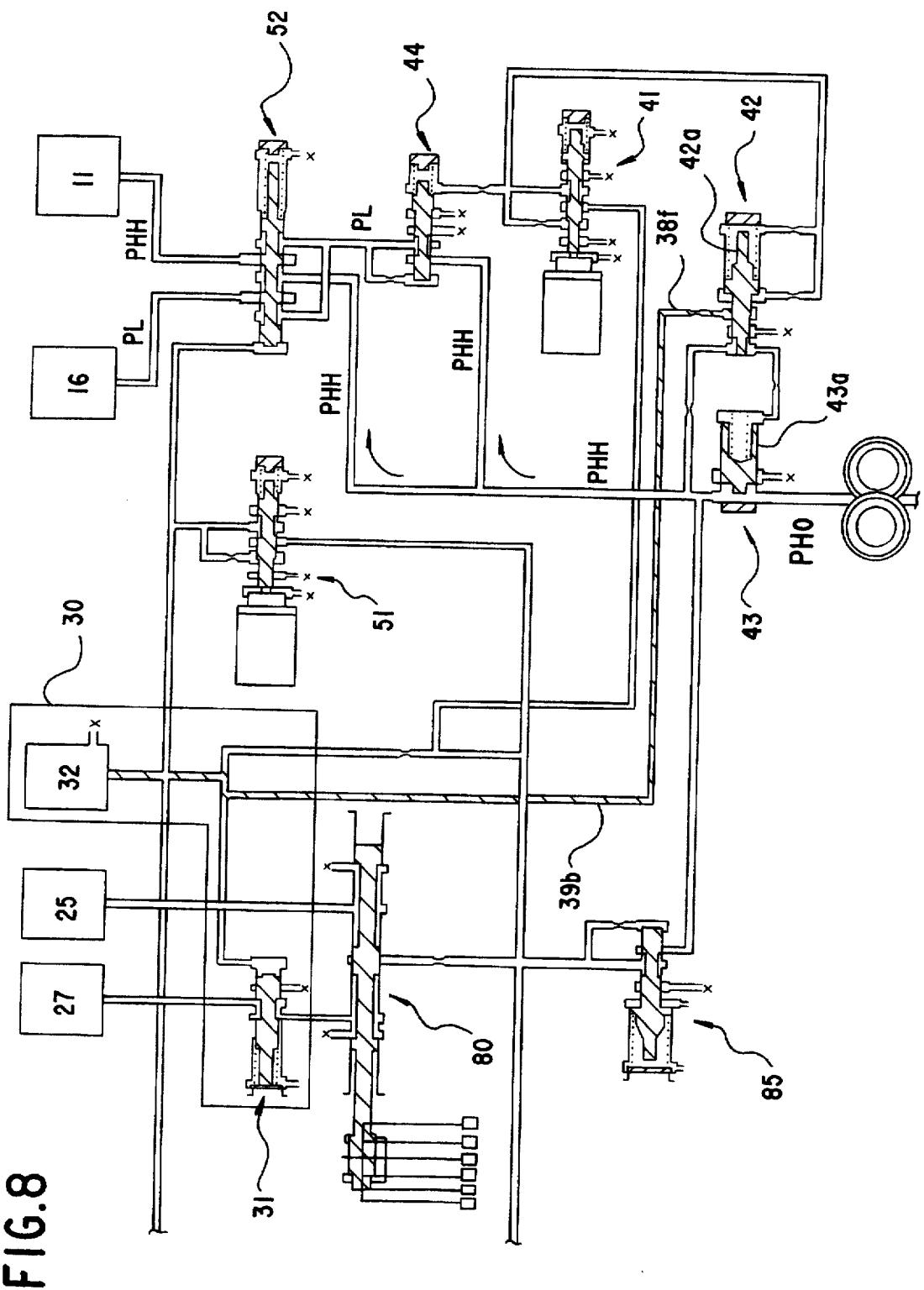
FIG. 8 is a circuit diagram showing an inhibit solenoid valve according to the invention.

FIG. 8 is a view showing the operation of the inhibit solenoid valve 32 taken in conjunction of the condition (2) previously described with reference to FIG. 4.

Under the condition (2), the inhibit solenoid valve 32 is opened whereupon the secondary pressure of the inhibit valve 31, and the respective pressures in a fluid passage 39b and the fluid passage 38f indicated by a number of diagonal lines for clarity go down to zero. a result, the spool 42a of the high-pressure control valve 42 is displaced leftwards in FIG. 8 which will increases the secondary pressure of the high-pressure regulator valve 43 to a value PHH which is higher than PH1. On the other hand, the low-pressure regulator valve 44 is continuously supplied with the control pressure PH3 (FIG. 5), the increased primary pressure PHH is regulated to the predetermined constant pressure PL.

Figure 9:
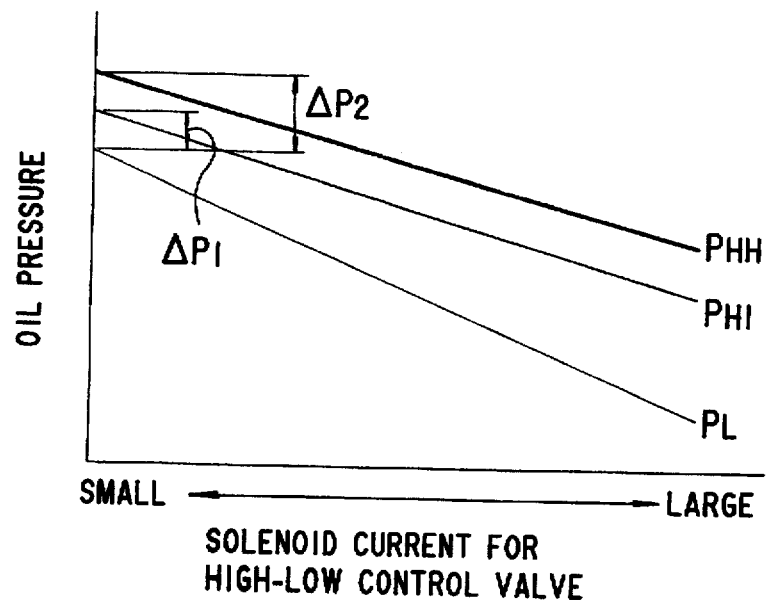
FIG. 9 is a graph showing the relationship between the speed ratio of the continuously variable transmission and the hydraulic pressure.

FIG. 9 is a graph showing the relationship between the speed ratio of the CVT (which is represented by the solenoid current of the high-low pressure control valve) and the hydraulic pressure (labeled as "OIL PRESSURE 2"). The x axis of the graph is the solenoid current of the high-low pressure control valve, and the y axis is the hydraulic pressure. In FIG. 9, the line PL indicates the low hydraulic pressure, the line PH1 is the high hydraulic pressure in the normal mode, and the line PHH is the high hydraulic pressure in the intensified pressure mode.

It appears clear from FIG. 9 that at the "small" side end of the x axis, the normal mode provides a pressure difference ΔP1 (i.e., a difference in pressure between the high hydraulic pressure PH1 and the low hydraulic pressure PL), while the intensified pressure mode provides a much greater pressure difference ΔP2 (between PHH and PL) than the ΔP1. With this large pressure difference ΔP2, a more rapid shifting can be achieved with considerable reductions in shift time. Similar operation and effect can be attained at the "large" side end of the x axis and at any other solenoid currents.

Figure 10:
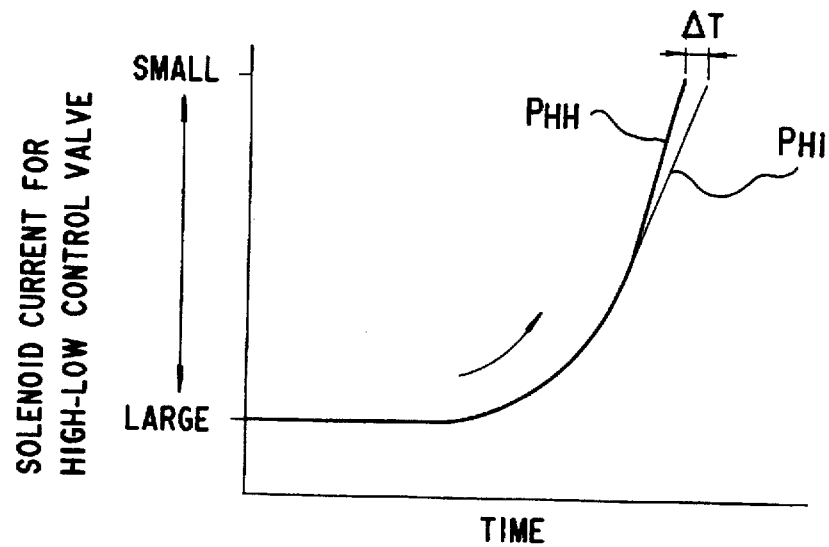
FIG. 10 is a graph showing the time needed for the shift of the continuous variable transmission according to the present invention.

FIG. 10 is a graph showing the time needed for the shift of the CVT according to the present invention. The x axis of the graph is the time, and the y axis is the speed ratio which is represented by the solenoid current of the high-low pressure control valve). In FIG. 10, PH1 represents the curve obtained in the normal mode, and the curve designated by PHH is obtained in the intensified pressure mode.

As is apparent from FIG. 10, when the speed ratio plotted on the y axis is to be rapidly varied from "large" to "small", the intensified pressure mode performs the desired speed change or shift in a time which is shorter by ΔT than the time taken in the normal mode to achieve the desired shift.

It will be appreciated that according to the present invention, the pressure difference between the high hydraulic pressure and the low hydraulic pressure in the power system is enlarged only when a rapid speed change or shift is desired. Accordingly, there is no hydraulic loss produced in normal operating conditions. The hydraulic control apparatus of this invention requires no actuator provided exclusively for achieving the rapid speed change but utilizes an existing high-pressure control means after simple modification. The apparatus can, therefore, be used with an existing continuously variable transmission. In addition, since the low hydraulic pressure is kept constant regardless of a pressure rise in the high hydraulic pressure, the belt is free from the slipping problem.

In the illustrated embodiment, the high-pressure control valve 42 provided as a pressure control portion or unit of the high-pressure regulator valve 43 is disposed separately from the high-pressure regulator valve 43, for purposes of illustration. The high-pressure control valve 42 and the high-pressure regulator valve 43 may be integral with each other. Stated in other words, only a single regulator valve is satisfactory provided that the regulator valve has a function corresponding to that of the high-pressure control valve 42.

The high- and low-pressure regulator valves should by no means be limited to the type disclosed, but may include any other type capable of performing the required pressure regulation with no reliance on the adjustment of the amount of drain.

Obviously, various minor changes and modifications of the present invention are possible in the light of the above teaching. It is therefore to be understood that within the scope of the appended claims the invention may be practiced otherwise than as specifically described.

What is claimed is:

1. A hydraulic control apparatus for a continuously variable transmission mounted in a motor vehicle, the transmission being of a belt type continuously variable transmission including a V-belt extending between a drive pulley and a driven pulley, said pulleys having a drive cylinder chamber and a driven cylinder chamber, respectively wherein the respective hydraulic pressures in said cylinder chambers are varied according to operating conditions of the motor vehicle to vary the respective widths of said pulleys, said hydraulic control apparatus comprising:

a shift control valve for selectively supplying a high hydraulic pressure and a low hydraulic pressure to said drive cylinder chamber and said driven cylinder chamber while regulating said hydraulic pressures;

a high-pressure regulator valve and a low-pressure regulator valve for supplying a pressure-regulated high hydraulic pressure and a pressure-regulated low hydraulic pressure, respectively, to said shift control valve;

a high-low pressure control valve for supplying a control pressure to said high-pressure regulator valve and said low-pressure regulator valve for controlling said regulator valves;

an inhibit valve for stopping the supply of a hydraulic pressure to a reverse-drive brake of the transmission while the vehicle is being driven forward; and a solenoid valve for controlling a control hydraulic pressure used for controlling the operation of said inhibit valve, and for applying said control hydraulic pressure to said high-pressure regulator valve so as to further increase said high hydraulic pressure, wherein when a rapid speed change is desired according to the operating conditions of the motor vehicle, said solenoid valve is operated to relieve the hydraulic pressure in a fluid passage to urge said high-pressure regulator valve further toward a low pressure side, thereby increasing said high hydraulic pressure alone to increase a pressure difference between said high hydraulic pressure and said low hydraulic pressure.

* * * * *